United States Patent
Dewan et al.

(10) Patent No.: US 10,789,061 B2
(45) Date of Patent: Sep. 29, 2020

(54) PROCESSOR BASED COMPONENT FIRMWARE UPDATE METHOD AND APPARATUS

(71) Applicant: Intel Corporation, Santa Clara, CA (US)

(72) Inventors: Prashant Dewan, Portland, OR (US); Siddhartha Chhabra, Portland, OR (US); Uttam Sengupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/143,334

(22) Filed: Sep. 26, 2018

(65) Prior Publication Data

US 2019/0042230 A1 Feb. 7, 2019

(51) Int. Cl.
| | |
|---|---|
| *G06F 8/65* | (2018.01) |
| *H04L 9/30* | (2006.01) |
| *G06F 21/57* | (2013.01) |
| *H04L 9/32* | (2006.01) |
| *G06F 8/654* | (2018.01) |

(52) U.S. Cl.
CPC ............... *G06F 8/65* (2013.01); *G06F 8/654* (2018.02); *G06F 21/57* (2013.01); *H04L 9/30* (2013.01); *H04L 9/3234* (2013.01); *H04L 9/3236* (2013.01); *H04L 9/3247* (2013.01); *G06F 2221/033* (2013.01)

(58) Field of Classification Search
CPC .... G06F 21/572; G06F 8/65; G06F 2221/033; G06F 9/57; G06F 8/654; G06F 21/57; H04L 9/3247; H04L 9/3236; H04L 9/3234; H04L 9/30
See application file for complete search history.

(56) References Cited

U.S. PATENT DOCUMENTS

| | | | | |
|---|---|---|---|---|
| 6,536,038 | B1 * | 3/2003 | Ewertz | G06F 8/65 711/1 |
| 9,880,852 | B2 * | 1/2018 | Tan | G06F 9/3017 |
| 10,163,179 | B2 * | 12/2018 | Schluesser | G06T 1/20 |
| 10,552,620 | B2 * | 2/2020 | Desai | G09C 1/00 |
| 2004/0093597 | A1 * | 5/2004 | Rao | G06F 8/65 717/171 |

(Continued)

OTHER PUBLICATIONS

"Kvarda et al";"Software Implementation of a Secure Firmware Update Solution in an IOT Context";"8 pages"; (Year: 2016).*

(Continued)

*Primary Examiner* — Wei Y Zhen
*Assistant Examiner* — Brahim Bourzik
(74) *Attorney, Agent, or Firm* — Schwabe, Williamson & Wyatt, P.C.

(57) ABSTRACT

Apparatuses, methods and storage mediums associated with updating firmware of a component of a computer platform, are disclosed herein. In some embodiments, a processor includes an instruction decoder; and a storage having microcode arranged to implement an instruction to verify updates to firmware of a component of a computer platform hosting the processor and the component. The computer platform may include a component firmware update manager. The firmware of a component may include a firmware update plug-in. Other embodiments are also described, and may be claimed.

25 Claims, 4 Drawing Sheets

(56) References Cited

U.S. PATENT DOCUMENTS

| | | | | |
|---|---|---|---|---|
| 2013/0013905 A1* | 1/2013 | Held | ............... | G06F 21/572 |
| | | | | 713/2 |
| 2013/0185563 A1* | 7/2013 | Djabarov | ............... | G06F 8/654 |
| | | | | 713/176 |
| 2014/0082373 A1* | 3/2014 | Colnot | ............... | G06F 21/575 |
| | | | | 713/193 |
| 2016/0085558 A1* | 3/2016 | Anbazhagan | ............... | G06F 8/654 |
| | | | | 713/2 |
| 2016/0378976 A1* | 12/2016 | Kotary | ............... | G06F 21/53 |
| | | | | 713/193 |
| 2017/0090909 A1* | 3/2017 | Guo | ............... | G06F 8/66 |
| 2018/0247082 A1* | 8/2018 | Durham | ............... | G06F 21/57 |
| 2019/0007216 A1* | 1/2019 | Meriac | ............... | G06F 21/53 |

OTHER PUBLICATIONS

Sabt et al;"Trusted Execution Environment: What It Is, and What It Is Not"; "8 pages"; (Year: 2015).*

* cited by examiner

US 10,789,061 B2

PROCESSOR BASED COMPONENT FIRMWARE UPDATE METHOD AND APPARATUS

TECHNICAL FIELD

The present disclosure relates to the field of computing. More particularly, the present disclosure relates to updating firmware of a component on computer platform, such as, a system-on-chip (SoC).

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Increasingly, computer platform manufacturers, such as SoC manufacturers, would like to adopt a computer platform or SoC independent component approach, where one component (also referred to as intellectual property or IP for short) is completely independent of other components (IPs). Thus, any IP can be quickly integrated into a SoC without having to pull in a chain of dependent IPs, clock signals, debug signals, power rails, security assets etc. As a result, IPs need to be self-sufficient in their ability to load secure firmware or depend on components that majority of the SoCs contain.

Traditionally, many IPs on a SoC have been dependent on a security controller on the SoC to verify the firmware and copy the firmware into a secure or isolated memory region, a protected area in memory, and then direct the IP to load the verified firmware. In certain cases, the security controller has also been responsible for loading the IP firmware from a persistent storage, e.g., a serial peripheral interface (SPI) persistent storage or an embedded multi-media controller (eMMC) persistent storage. To achieve the desired independence, all these services will have to be migrated out of the security controller, so the IPs are no longer dependent on the security controller.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
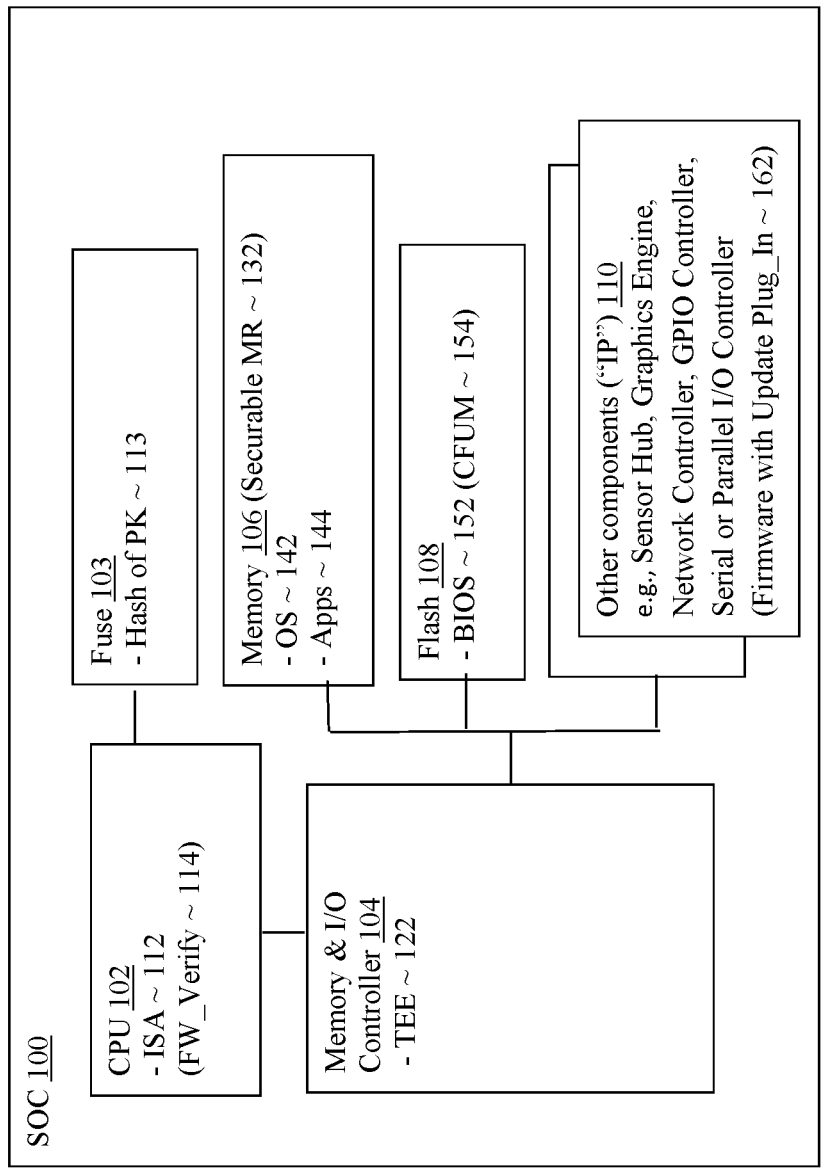
FIG. 1 illustrates an example computer platform/SoC having the processor based component firmware update technology of the present disclosure, according to various embodiments.

Accordingly, the present disclosure provides a more efficient processor based approach to securely update firmware of components or IP of a computer platform or SoC, that allows the IPs of a computer platform or SoC to achieve their independence from other IPs of the computer platform or SoC. In various embodiments, a processor is provided with an instruction decoder; and a storage having microcode arranged to implement an instruction to verify updates to firmware of a component or IP of a computer platform or SoC hosting the processor and the component or IP. To implement the instruction, the microcode is arranged to first verify authenticity of a manifest associated with the updates, then verify integrity of the updates on verification of the authenticity of the manifest. Further, the microcode is arranged to verify and affirm security of the memory region holding the updates, on verification of the integrity of the updates.

The computer platform or SoC is provided with a component firmware update manager (CFUM) (e.g., as part of a basic input/output system (BIOS) or an operating system (OS) embedded with the SoC) to load the updates into a memory region that can be secured, and on loading the updates into the memory region, secure the memory region. On securing the memory region, the CFUM issues the firmware verification instruction for execution by the processor. On receipt of execution control again, after the processor has executed the firmware verification instruction, the CFUM notifies the component or IP of the availability of the secure updates. In various embodiments, the CFUM notifies a firmware update plug-in of the component or IP's firmware.

In various embodiments, the component or IP's firmware is provided with the firmware update plug-in. In addition to being arranged to receive the notification of the availability of secure updates from the CFUM, the firmware update plug-in is further arranged to verify the updates on receipt of the notification, and on verification, apply the updates. Still further, the firmware update plug-in is arranged to inform the CFUM after applying the updates.

In various embodiments, the CFUM is further arranged to issue the firmware verification instruction for execution by the processor again to clear the security of the memory region, to make the securable memory region available for use for another update or other non-update use.

These and other aspects of the present disclosure will be described in further detail with references to the accompanying drawings. Alternate embodiments of the present disclosure and their equivalents may be devised without parting from the spirit or scope of the present disclosure. It should be noted that like elements disclosed below are indicated by like reference numbers in the drawings. Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Further-more, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an example computer platform/SoC having the processor based component firmware update technology of the present disclosure, according to various embodiments, is illustrated. As shown, example computer platform/SoC (hereinafter, simply SoC) 100 includes processor/CPU (hereinafter, simply CPU) 102, memory and input/output (I/O) controller 104, memory 106, flash 108, and other components/IP (hereinafter, simply IP) 110, coupled with each other. CPU 102, memory 106, flash 108 and other components/IP 110 are respectively incorporated with aspects of the processor based component firmware update technology of the present disclosure, that enable components/IP 110 to be substantially independent of each other.

CPU 102 is arranged to support an instruction set architecture (ISA) 112 having a plurality of instructions, like Add, Subtract, Load, Store, Move, Copy, and so forth. In particular, for the illustrated embodiments, ISA 112 includes a firmware verification instruction (hereinafter, simply FW_Verify) 114, which on execution, verifies updates to firmware of one of the IPs 110, to be described more fully below. Except for the novel inclusion of support for the FW_Verify instruction, CPU 102 may otherwise be any one of a number of single or multi-core processors known in the art.

Memory & I/O controller 104 is arranged to coordinate interactions between CPU 102 and memory 106, flash 108, and IPs 110. In various embodiments, memory & I/O controller 104 may include a trusted execution environment (TEE) 122, e.g., a manageability engine (ME). However, as will be evident from the description to follow, the security of the firmware updates under the present disclosure is achieved without reliance on TEE 122, enabling IPs 110 to be independent of memory & I/O controller 104, as well as of other IPs 110. Thus, memory & I/O controller 104 may be any one of a number of memory & I/O controllers known in the art. In other embodiments, instead of being an integrated memory & I/O controller, separate memory and I/O controllers may be provided instead.

Memory 106 is arranged to store instructions and/or data, e.g., instructions and/or data associated with OS 142 and/or various applications 144. In particular, for the illustrated embodiments, memory 106 includes a number of memory regions 132 that can be secured, in terms of who has read access, write access or control access. The various securable memory regions 132 are employed to store sensitive instructions or data that needs protection, e.g. updates to the firmware of IPs 110. It should be noted that the updates may update in part or in whole (i.e., the entirety), the firmware of an IP 110. Except of the securable memory regions (SMR) and their use, memory 106 may otherwise be any one of a number memory elements known in the art, including, but are not limited to, dynamic random access memory (DRAM). An example of SMR may be isolated memory regions (IMR) supported for Intel architecture computing machines.

Flash 108 is arranged to store a basic input/output system (BIOS) 152. For the illustrated embodiments, BIOS 152 includes a component firmware update manage (CFUM) 154. CFUM 154 is arranged to cooperate with CPU 102 and IP 110 to effectuate the processor based firmware update technology of the present disclosure, to be described more fully below. Except for CFUM 154, BIOS 152 and Flash 108 may be any one of a number of these elements known in the art. In some embodiments, BIOS 152 may support the unified extensible firmware interface (UEFI). Flash 108 may be electrically erasable programmable read only memory (EEPROM). In alternate embodiments, CFUM 154, in lieu of being part of BIOS 152, may be part of OS 142 instead.

Each of IP 110 may include firmware. In various embodiments, the firmware include a firmware update plug-in 162 to cooperate with CFUM 154 in effectuating the processor based component firmware update technology of the present disclosure. Except of firmware update plug-in 162, each of IP 110 may be any one of a number of IPs known in the art. Examples of these IPs include, but are not limited to, sensor hubs, graphics engines, network controllers, general purpose input/output (GPIO) controllers, serial or parallel input/output (I/O) controllers, and so forth. Sensor hubs may support a variety of sensors including, but are not limited to, global positioning system (GPS) sensors, light detection and ranging (LIDAR) sensors, accelerometers, gyroscopes, and so forth. Network controllers may include, but are not limited to, WiFi, Long Term Evolution (LTE) 4G or 5G controllers, Bluetooth® controllers, near field communication (NFC) controllers, and so forth. Serial I/O controllers may include, but are not limited to, universal serial bus (USB) controllers, high definition multi-media interface (HDMI) controllers, and so forth. An example of parallel I/O controller is peripheral component interface (PCI) controllers.

In various embodiments, a firmware verification key 113 is used in the processor based component firmware update technology of the present disclosure. The firmware verification key, for some embodiments, may be a public encryption key (public key, Pkey or PK, for short) of the component/IP manufacture or for other embodiments, a PK of the SoC manufacturer. For the illustrated embodiments, SoC 100 further includes a fuse 103 for storing a hash 113 of PK. During operation, CPU 102 retrieves the hash 113 of PK from fuse 103 to verify authenticity of a manifest associated with an update.

These and other aspects of the processor based component firmware update technology of the present disclosure will be further described below with references to remaining FIGS. 2-4.

Figure 2:
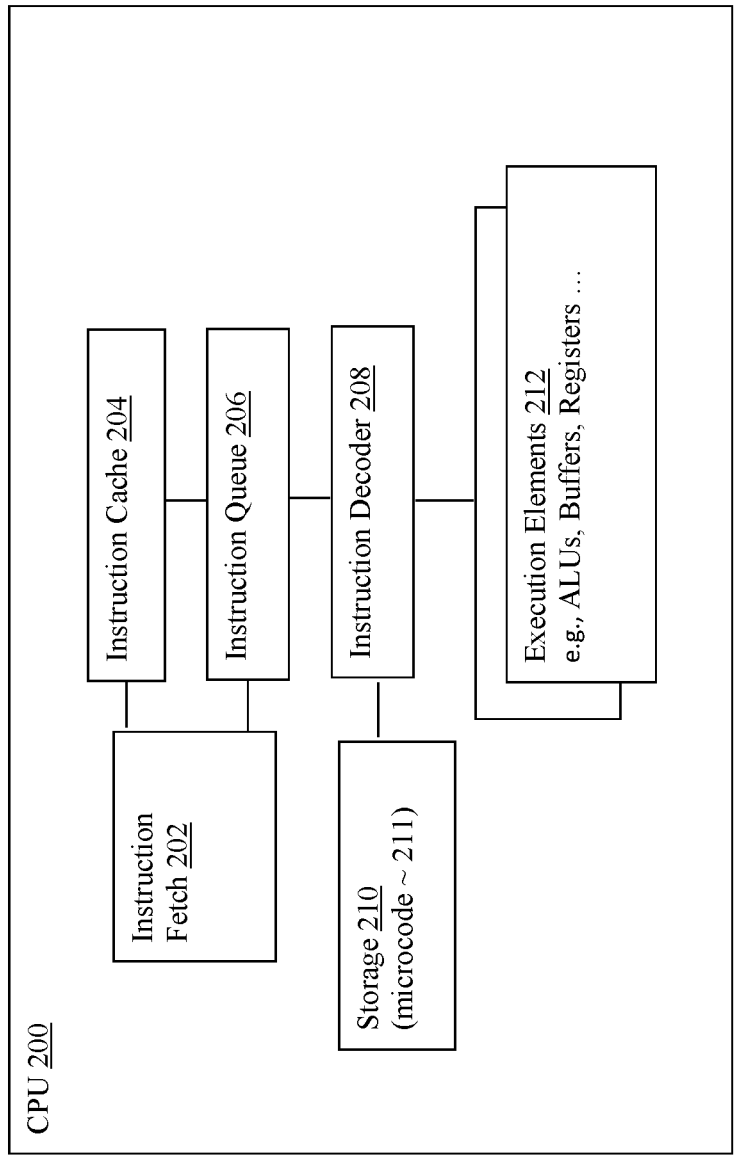
FIG. 2 illustrates an example processor/CPU implementing processor aspects of the processor based component firmware update technology of the present disclosure, according to various embodiments.

Referring now to FIG. 2, wherein an example processor/CPU implementing processor aspects of the processor based component firmware update technology of the present disclosure, according to various embodiments, is illustrated. As shown, example CPU 200, which may be CPU 102 of FIG. 1, includes instruction fetch unit 202, instruction cache 204, instruction queue 206, instruction decoder 208, persistent storage 210, and execution elements 212. Instruction cache 204 is arranged to cache (the most recent) instructions of programs, e.g., CFUM 154, being executed by CPU 200. Instruction fetch unit 202 is arranged to fetch and move the next series of instructions to be executed from instruction cache 204 into instruction queue 206.

Storage 210 is arranged to store various microcode 211 that implement the instructions of the ISA of CPU 200. In particular, the ISA of CPU 200 includes the FM_Verify instruction, and microcode 211 include the microcode for implementing the FM_Verify instruction. Instruction decoder 208 is arranged to decode the queued instructions in instruction queue 206, using microcode 211 stored in storage 210. On decoding, the microcode are forwarded to selected ones of execution elements 212 to execute.

Except for microcode in support of the FM_Verify instruction, which will be further described below, instruction fetch unit 202, instruction cache 204, instruction queue 206, instruction decoder 208, storage 210, and execution elements 212 may be any one of these elements known in the art. In particular, execution elements 212 may include, but are not limited to, arithmetic logic units (ALU), buffers, registers, register alias tables, reservation stations, and so forth.

Figure 3:
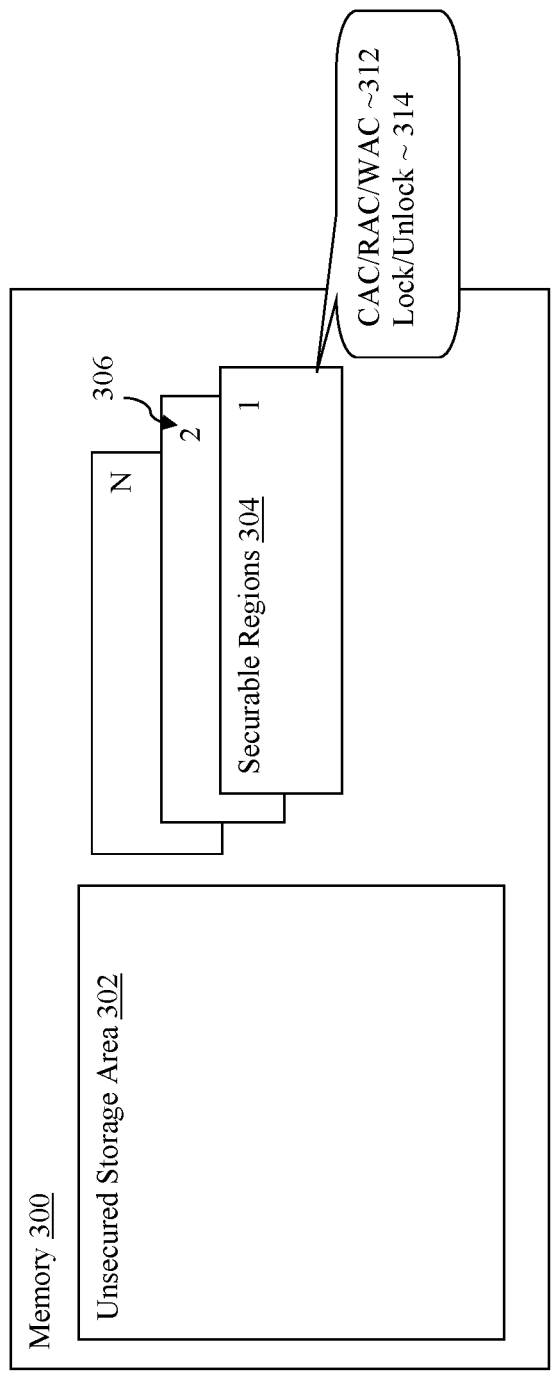
FIG. 3 illustrates an example memory suitable for use to practice the present disclosure, according to various embodiments.

Referring now to FIG. 3, an example memory suitable for use to practice the present disclosure, according to various embodiments, is illustrated. As shown, memory 300, which may be memory 106 of FIG. 1, includes unsecured storage area 302 and a number of securable regions 304. Unsecured storage area 302 is used for general storage of instruction and/or data that do not need heightened security/protection. Securable regions 304 are used to store instruction and/or data that need heightened security/protection, such as updates to firmware of IP 110.

For the illustrated embodiments, each securable region 303 has an associated identifier 306, 1 through N, for easily identifying the securable region. Further, each securable region 304 has associated access control for controlling who can has read, write or control access of the region. More specifically, each securable region 304 includes read access control (RAC) in specifying who can read the content of the region, and write access control (WAC) in specifying who can write into the region (including modifying content in the region). Further each securable region 304 includes control access control (CAC) in specifying who can modify the RAC, WAC, as well as the CAC, to control the read, write as well as controlling the control of the region.

For the illustrated embodiments, each memory region 304 also has an associated lock/unlock indicator (or bit) 314, which can be set or reset by CPU 102/200 only, for the CPU to affirm that the content in the memory region has been verified and secured, or to indicate the memory region is no longer being secured, and may be reused for other purposes.

Except for securable regions 304 having identifiers 306, CAC/RAC/WAC 312 and lock/unlock indicator 314, memory 300 may otherwise be any one of a number of memory elements known in the art. Usage of identifiers 306, CAC/RAC/WAC 312 and lock/unlock indicator 314 to effectuate the processor based component firmware update technology of the present disclosure will be further described below with references to FIG. 4.

Figure 4:
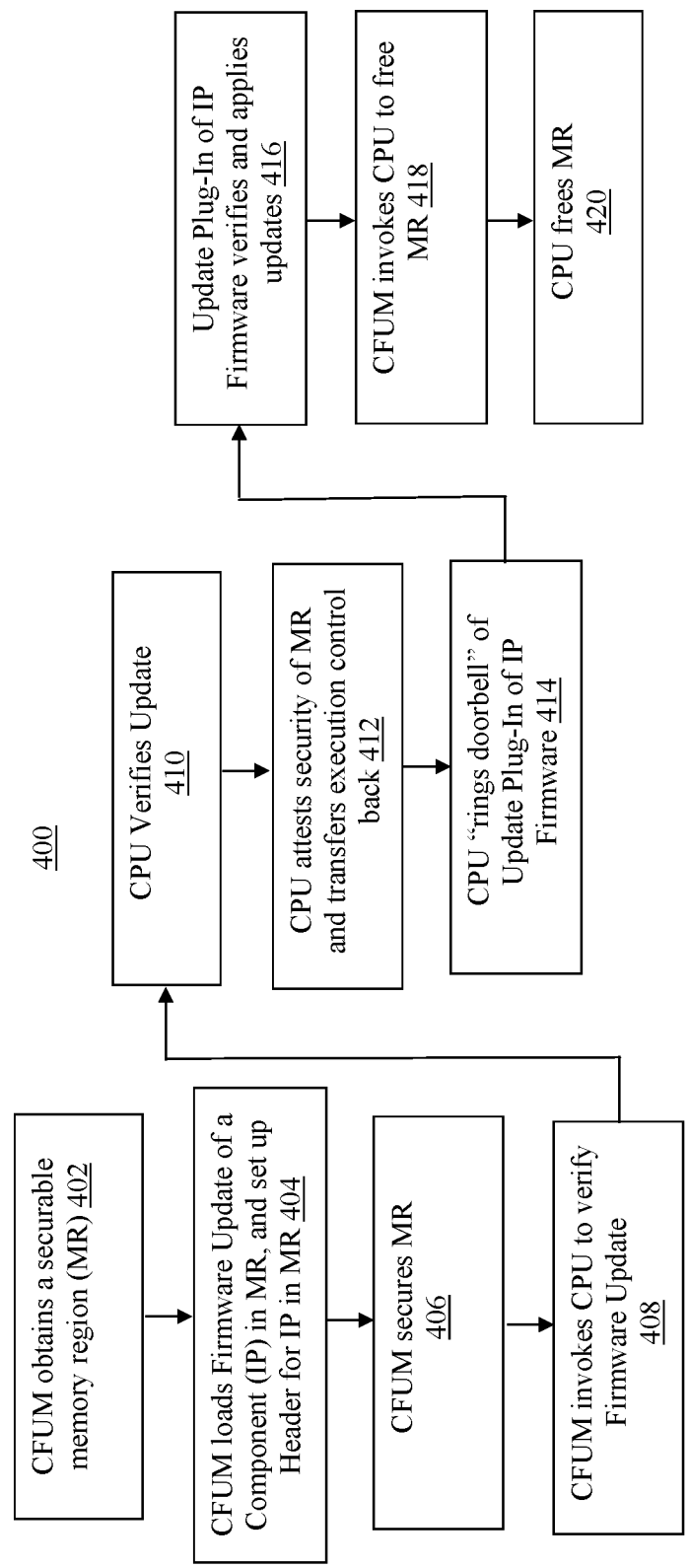
FIG. 4 illustrates an example process of the processor based component firmware update technology of the present disclosure, in accordance with various embodiments.

Referring now to FIG. 4, wherein an example process of the processor based component firmware update technology of the present disclosure, in accordance with various embodiments, is illustrated. As shown, process 400 for processor based component firmware update may include operations performed at blocks 402-420. For the illustrated embodiments, operations at blocks 402-408, 414 and 418 are performed by the earlier described CFUM 154. Operations at blocks 410-412 and 420 are performed by the earlier described CPU 102/200. Operations at block 416 is performed by firmware update plug-in 162 of the IP being updated.

Process 400 starts at block 402. At block 402, CFUM 154 obtains a securable memory region. In some embodiments, CFUM 154 may pre-obtain a number of securable memory regions at platform boot up. Next, at block 404, on obtaining a securable memory region, CFUM 154 loads firmware updates for an IP into one of the securable memory regions. The firmware updates may be loaded from any one of a number of sources, e.g., from a removable media attached to a computer system having the SoC or from a remote server via one or more networks. Further, in various embodiments, the update has an associated manifest, and CFUM 154 sets up a header associated with the update for the IP, based on data in the manifest. An example manifest and an example header may respectively include the following information:

Example Manifest:

| Field | Description |
| --- | --- |
| Signature of the Manifest | This signature will go over the whole of the manifest data structure and will be used for verifying the source of the manifest |
| IP Identifier (ID) | Every IP has a unique Identifier. |
| Firmware verification Key | The key to generate the hash to verify the firmware |
| SoC Identifier | This will be verified by the CPU to confirm the update is for this Soc |
| Hash of the firmware | This is the hash of the firmware update that the CPU will verify to confirm integrity of the update |
| Signer of manifest | Whether the firmware is signed by SoC or IP manufacturer |

Example Header:

| Field | Size (b) | Source of Data | Description |
| --- | --- | --- | --- |
| IP ID | 8 | Manifest | This is a unique ID for the IP. IP is expected to match this number with its own ID |
| BUP Size | 8 | Manifest | Size of the Bring Up Package, a mini bootloader of the IP. IP is expected to load the BUP: BUP_SIZE bytes from MR BASE_ADDRESS + FW HEADER_SIZE |
| Blob Size | 8 | Manifest | IP is expected to copy FIRMWARE BLOB_SIZE bytes from MR BASE_ADDRESS + FW HEADER_SIZE + BUP_SIZE |
| Signer | 1 | Manifest | Whether the firmware is signed by SoC or IP manufacturer. Each IP can decide whether the firmware has to be signed by SoC or IP manufcaturer |

Next, at block 406, CFUM 154 secures the memory region having the firmware update loaded, and the header created. In various embodiments, CFUM 154 removes itself from having read or write access to the memory region, and sets up the read access of the memory region to provide the firmware update plug-in 162 with the read access. Further, CFUM 154 sets up the control over controlling access to the memory region to give CPU 102/200 the exclusive right in setting who has access to the memory region, and what type of access.

Next, at block 408, on securing the memory region, CFUM 154 invokes CPU 102/200 to verify the update secured in the memory regions. In various embodiments, to invoke CPU 102/200 to verify the update secured in the memory regions, CFUM 154 requests the FW_Verify instruction of CPU 102/200 to be executed.

At block 410, CPU 102/200 verifies the update. In various embodiments, in response to the request to execute the FW_Verify instruction to verify the update in the secured memory region, an instruction fetch unit of CPU 102/200 fetches the instruction and dispatches the instruction to a decoder of CPU 102/200, which in turn decodes the instruction into the microcode that implement the instruction. In various embodiments, on execution, the microcode first verify the authenticity of the manifest of the update. On verification of authenticity of the manifest, the microcode verify the integrity of the update.

More specifically, in various embodiments, the request to execute the FW_Verify instruction includes the virtual address of the manifest, the virtual address of the update, and the identifier of the secured memory region, e.g., as operands of the FW_Verify instruction. The microcode in executing the FW_Verify instruction, retrieves the manifest using the virtual address of the manifest and the identifier of the memory region provided. On retrieving the manifest, the microcode verify the authenticity of the manifest using the signature and the firmware verification key or PK in the manifest, and the hash of PK stored in the fuse of CPU 102/200. On verification of the authenticity of the manifest, the microcode also verify the manifest is for SoC 100. Additionally, on verification that the authentic manifest is indeed for SoC 100, the microcode in executing the FW_Verify instruction, accesses the update using the virtual address of the update and the identifier of the memory region provided. The microcode verify the integrity of the update, ensuring the update has not been modified/comprised, by generating a hash of the update, using the PK provided in the manifest, and comparing the generated hash with the hash provided in the manifest.

Next, at block 412, on verifying the integrity of the update, CPU 102/200 attests to the secured state of the memory regions, and transfers execution control back to CFUM 154. In various embodiments, as described earlier, the securable memory region has an associated security indicator, e.g., a lock/unlock bit, that only CPU 102/200 can set and reset. For these embodiments, as part of executing the FM_Verify instruction, on verification of the integrity of the update, the microcode sets the security indicator to "lock," to attest to the secured state of the memory region. Thereafter, the microcode returns execution control to CFUM 154.

At block 414, on receipt of execution control again, CFUM 154 notifies the IP of the availability of the verified update in the secured memory region. In various embodiments where the IP includes the firmware update plug-in 162 with an indicator (doorbell) to receive the notification, CFUM 154 sets the indicator ("ring the doorbell") to notify the IP.

Next, at block 416, on receipt of the notification (having its "doorbell rung"), firmware update plug-in 162 of the IP first verifies that the memory region is in a secured state, as attested by CPU 102/200. On confirming the CPU attested secure state of the memory region, firmware update plug-in 162 of the IP verifies the update and on verification, applies the update to the firmware. In various embodiments, on applying the update to the firmware, firmware update plug-in 162 of the IP informs CFUM 154 of the completion of the application of the update to the firmware of the IP.

At block 418, on receipt of the notification that the update has been applied, CFUM 154 notifies the CPU to free the memory region, making the memory region available for re-use for other purposes. In various embodiments, CFUM 154 requests execution of the FM_Verify instruction with operands identifying the memory region, and the action to free the memory region. In alternate embodiments, in lieu of notifying CFUM 154, firmware update plug-in may directly request execution of the FM_Verify instruction with operands identifying the memory region, and the action to free the memory region.

At block 420, in response to receipt of the request to free the memory region, CPU 102/200 frees the memory region, making it available for reuse for other purposes. In various embodiments, in response to the request to execute the FW_Verify instruction to free the memory region, an instruction fetch unit of CPU 102/200 fetches the instruction and dispatches the instruction to a decoder of CPU 102/200, which in turn decodes the instruction into the microcode that implement the instruction. In various embodiments with the memory region having the security indicator (lock/unlock bit) for CPU 102/200 to attest to the secured state of memory region, on execution, the microcode resets the security indicator (to an "unlocked" state) to free the memory region, making it available for reuse for other purposes.

Thus various example embodiments of the present disclosure have been described including, but are not limited to:

Example 1 is a processor comprising: an instruction decoder; and a storage having microcode arranged to implement an instruction to verify updates to firmware of a component of a computer platform hosting the processor and the component.

Example 2 is example 1, wherein the microcode is arranged to verify a manifest associated with the updates.

Example 3 is example 2, wherein the instruction can be dispatched with a virtual address and an identifier of a memory region associated with where the manifest is stored, and the computer platform includes a fuse having a verification public key; and wherein the microcode is arranged to access the manifest using the virtual address and the memory region identifier, and verify authenticity of the manifest using the verification public key.

Example 4 is example 3, wherein the verification public key is a selected one of a public key of a manufacturer of the processor or a public key of a manufacturer of the component.

Example 5 is example 3, wherein the microcode is further arranged to verify the manifest is associated with the component.

Example 6 is example 2, wherein the instruction can be dispatched with a virtual address and an identifier of a memory region associated with where the updates are stored, and the manifest includes a hash of the updates; and wherein the microcode is arranged to verify integrity of the updates, using the hash in the manifest, after verification of the manifest.

Example 7 is example 6, wherein the microcode is further arranged to verify security of the memory region, after verification of the integrity of the updates.

Example 8 is example 7, wherein the microcode is arranged to verify that read access control of the memory region provides read access to the component, or to verify that write access control of the memory region does not permit any write access.

Example 9 is example 7, wherein the microcode is arranged to verify that control access control of the memory region provides the microcode with exclusive rights in reconfiguring read or write access control of the memory region.

Example 10 is example 7, wherein the memory region has an associated lock indicator, settable or re-settable only by the processor; and wherein the microcode is arranged to set the lock indicator to denote a locked status, after verification of the security of the memory region.

Example 11 is example 10, wherein the instruction can be dispatched with a request to reset the associated lock indicator of the memory region; and the microcode is arranged to reset the associated lock indicator of the memory region to an unlocked status, on receipt of the instruction with the request to reset.

Example 12 is at least one computer-readable medium (CRM) comprising instructions to implement at least a component firmware update manager of a computer platform, in response to execution of the instructions by a processor of the computer platform, to: load updates for firmware of a component of the computer platform into a memory region of the computer platform; secure the memory region; and invoke the processor to verify the updates; wherein acceptance by the component of the updates to its firmware is conditioned on the verification of the updates by the processor.

Example 13 is example 12, wherein to load updates for firmware of a component of the computer platform into a memory region of the computer platform comprises to load updates for firmware of a component of the computer platform into an isolated memory region of the computer platform.

Example 14 is example 12, wherein to secure the memory region comprises to configure control access control of the memory region to provide the processor with exclusive right in reconfiguring the control access control of the memory region.

Example 15 is example 12, wherein to secure the memory region comprises to configure read access control or write access control of the memory region to remove the component firmware update manager from having read or write access to the memory region.

Example 16 is example 12, wherein to invoke the processor to verify the updates comprises to request dispatch of a firmware verification instruction of the processor for execution, to have the processor verifies the firmware.

Example 17 is example 16, wherein the component firmware update manager is to further inform the component of availability of the updates in the secured memory region, after receipt of execution control after the processor has verified the updates.

Example 18 is example 17, wherein to inform the component of availability of the updates in the secured memory region comprises to set a notification bit of an update plug-in of the firmware of the component.

Example 19 is example 17, wherein the component firmware update manager is to further request dispatch of the firmware verification instruction of the processor for execution, to have the processor remove security and free the memory region, after receipt of notification from the component with respect to the component having accepted or rejected the updates to its firmware.

Example 20 is example 12, wherein the instructions are to implement a basic input/output system (BIOS) or an operating system (OS) having the component firmware update manager.

Example 21 is example 12, wherein the updates replace the entire firmware.

Example 22 is a component, comprising: firmware to implement functions of the component; and an update plug-in to manage field update of the firmware, wherein the update plug-in includes a notification indicator for a component firmware update manager of a computer platform hosting the component to inform the component about availability of verified updates to the firmware at a processor locked secure memory region of memory of the computer platform.

Example 23 is example 22, wherein the update plug-in is arranged to retrieve the updates on receipt of the notification of the availability of verified updates, and to apply, with or without further verification, the updates to the firmware.

Example 24 is example 22, wherein the update plug-in is further arranged to notify the component firmware update manager on completion of applying the updates to the firmware or on determination not to apply the updates to the firmware.

Example 25 is example 22, wherein the computer platform is a system-on-chip (SoC); and wherein the component is a selected one of a sensor hub, a graphics engine, a network controller, a general purpose input/output (I/O) controller, a serial I/O controller.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A processor comprising:
an instruction set architecture having a plurality of instructions supported by the processor, including a verify instruction dedicated to a task of verifying updates to firmware included with a component of a computer platform hosting the processor and the component, wherein the verify instruction includes three operands to respectively provide to the processor, an identifier of a secured memory region where a manifest associated with the updates, and the updates, are located, a virtual address of a memory location of the manifest within the secured memory region, and a virtual address of a memory location of the updates within the secured memory region;
an instruction decoder; and
a storage having microcode arranged to implement the verify instruction when the verify instruction is invoked by a component firmware update manager (CFUM) to verify the updates to the firmware included with the component of the computer platform hosting the processor and the component;
wherein the verify instruction is invoked by the CFUM with the three operands of the dedicated verify instruction respectively set to the identifier of the secured memory region where the manifest and the update are located, the virtual address of the memory location of the manifest within the secured memory region, and the virtual address of the memory location of the update within the secured memory region.

2. The processor of claim 1, wherein the microcode is arranged to verify the manifest associated with the updates.

3. The processor of claim 2, wherein the computer platform includes a fuse having a verification public key; and wherein the microcode is arranged to access the manifest using the virtual address of the manifest and the memory region identifier, and verify authenticity of the manifest using the verification public key.

4. The processor of claim 3, wherein the verification public key is a selected one of a public key of a manufacturer of the processor or a public key of a manufacturer of the component.

5. The processor of claim 3, wherein the microcode is further arranged to verify the manifest is associated with the component.

6. The processor of claim 2, wherein the manifest includes a hash of the updates; and wherein the microcode is arranged to verify integrity of the updates, using the hash in the manifest, after verification of the manifest.

7. The processor of claim 6, wherein the microcode is further arranged to verify security of the memory region.

8. The processor of claim 7, wherein the microcode is arranged to verify that read access control of the memory region provides read access to the component, or to verify that write access control of the memory region does not permit any write access.

9. The processor of claim 7, wherein the microcode is arranged to verify that control access control of the memory region provides the microcode with exclusive rights in reconfiguring read or write access control of the memory region.

10. The processor of claim 7, wherein the memory region has an associated lock indicator, settable or re-settable only by the processor; and wherein the microcode is arranged to set the lock indicator to denote a locked status, after verification of the security of the memory region.

11. The processor of claim 10, wherein the verify instruction is dispatched with a request to reset the associated lock indicator of the memory region; and the microcode is arranged to reset the associated lock indicator of the memory region to an unlocked status, on receipt of the instruction with the request to reset.

12. At least one non-transitory computer-readable medium (NTCRM) comprising instructions to implement at least a component firmware update manager of a computer platform, in response to execution of the instructions by a processor of the computer platform, to:
load updates for firmware included with a component of the computer platform, and a manifest associated with the updates into a memory region of the computer platform;
secure the memory region; and
invoke a verify instruction of the processor to verify the updates, the verify instruction being one of a plurality of instructions of an instruction set architecture of the processor, dedicated to a task of verifying updates to any firmware included with any component of the computer platform, wherein the verify instruction includes three operands to respectively provide to the processor, an identifier of the secured memory region where the manifest associated with the updates, and the updates, are located, a virtual address of a memory location of the manifest within the secured memory region, and a virtual address of a memory location of the updates within the secured memory region, and wherein the processor includes storage having microcode that implements the verify instruction when invoked, and wherein the verify instruction is invoked by the component firmware update manager with the three operands of the dedicated verify instruction respectively set to the identifier of the secured memory region where the manifest and the update are located, the virtual address of the memory location of the manifest within the secured memory region, and the virtual address of the memory location of the update within the secured memory region;
wherein acceptance by the component of the updates to its included firmware is conditioned on the verification of the updates by the dedicated verify instruction of the processor.

13. The NTCRM of claim 12, wherein to load updates for the firmware of the component of the computer platform into a memory region of the computer platform comprises to load updates for the firmware of the component of the computer platform into an isolated memory region of the computer platform.

14. The NTCRM of claim 12, wherein to secure the memory region comprises to configure control access control of the memory region to provide the processor with exclusive right in reconfiguring the control access control of the memory region.

15. The NTCRM of claim 12, wherein to secure the memory region comprises to configure read access control or write access control of the memory region to remove the component firmware update manager from having read or write access to the memory region.

16. The NTCRM of claim 12, wherein to invoke the verify instruction of the processor to verify the updates comprises to request dispatch of the verify instruction of the processor for execution, to have the processor verify the firmware.

17. The NTCRM of claim 16, wherein the component firmware update manager is to further inform the component of availability of the updates in the secured memory region, after receipt of execution control after the processor has verified the updates.

18. The NTCRM of claim 17, wherein to inform the component of availability of the updates in the secured memory region comprises to set a notification bit of an update plug-in of the firmware of the component.

19. The NTCRM of claim 17, wherein the component firmware update manager is to further request dispatch of the verify instruction of the processor for execution, to have the processor remove security and free the memory region, after receipt of notification from the component with respect to the component having accepted or rejected the updates to its firmware.

20. The NTCRM of claim 12, wherein the instructions are to implement a basic input/output system (BIOS) or an operating system (OS) having the component firmware update manager.

21. The NTCRM of claim 12, wherein the updates to the firmware included with the component replace the entire firmware included with the component.

22. A component, comprising:
circuitry to couple the component to one or more other components or a processor of a computer platform hosting the processors and the components;
a memory having a firmware to implement functions of the component and an update plug-in to manage field update of the firmware,
wherein the update plug-in includes a notification indicator for a component firmware update manager of a computer platform hosting the component to inform the component about availability of verified updates to the firmware at a processor locked secure memory region of memory of the computer platform, after the component firmware update manager has verified the updates by invoking a verify instruction of the processor to verify the updates, the verify instruction being one of a plurality of instructions of an instruction set architecture of the processor, dedicated to a task of verifying updates to any firmware included with any component of the computer platform;

wherein the verify instruction includes three operands to respectively provide to the processor, an identifier of the secured memory region where a manifest associated with the updates, and the updates, are located, a virtual address of a memory location of the manifest within the secured memory region, and a virtual address of a memory location of the updates within the secured memory region;

wherein the verify instruction is invoked by the component firmware update manager with the three operands of the dedicated verify instruction respectively set to the identifier of the secured memory region where the manifest and the update are located, the virtual address of the memory location of the manifest within the secured memory region, and the virtual address of the memory location of the update within the secured memory region; and Wherein the processor includes storage having microcode that implements the verify instruction when invoked.

23. The component of claim 22, wherein the update plug-in is arranged to retrieve the updates on receipt of the notification of the availability of verified updates, and to apply, with or without further verification, the updates to the firmware.

24. The component of claim 22, wherein the update plug-in is further arranged to notify the component firmware update manager on completion of applying the updates to the firmware or on determination not to apply the updates to the firmware.

25. The component of claim 22, wherein the computer platform is a system-on-chip (SoC); and wherein the component is a selected one of a sensor hub, a graphics engine, a network controller, a general purpose input/output (I/O) controller, or a serial I/O controller.

* * * * *